US012054378B2

(12) United States Patent
Katz et al.

(10) Patent No.: US 12,054,378 B2
(45) Date of Patent: Aug. 6, 2024

(54) AUTOMATED CLEANING SYSTEM FOR BEVERAGE DISPENSING MACHINE

(71) Applicant: THE COCA-COLA COMPANY, Atlanta, GA (US)

(72) Inventors: Marc Katz, Marietta, GA (US); Arthur G. Rudick, Ormond Beach, FL (US); Samuel L. Orr, Buford, GA (US); Stan C. Kaplita, Sammamish, WA (US); James Alan Sanders, Atlanta, GA (US); William J. Moore, Atlanta, GA (US); Lindsey Jane Bozung, Smyrna, GA (US); Dick P. Welch, Marietta, GA (US); Jamal Omari Wilson, Snellville, GA (US)

(73) Assignee: The Coca-Cola Company, Atlanta, GA (US)

( * ) Notice: Subject to any disclaimer, the term of this patent is extended or adjusted under 35 U.S.C. 154(b) by 395 days.

(21) Appl. No.: 17/021,652

(22) Filed: Sep. 15, 2020

(65) Prior Publication Data

US 2020/0407208 A1 Dec. 31, 2020

Related U.S. Application Data

(63) Continuation of application No. 16/479,472, filed as application No. PCT/US2018/014384 on Jan. 19, 2018, now Pat. No. 10,822,219.

(Continued)

(51) Int. Cl.

| | |
|---|---|
| ***B67D 1/07*** | (2006.01) |
| ***B08B 3/04*** | (2006.01) |
| ***B08B 9/032*** | (2006.01) |

(52) U.S. Cl.
CPC .................. *B67D 1/07* (2013.01); *B08B 3/04* (2013.01); *B08B 9/0325* (2013.01); *B67D 2001/075* (2013.01)

(58) Field of Classification Search
CPC ............................ B67D 1/07; B67D 2001/075
See application file for complete search history.

(56) References Cited

U.S. PATENT DOCUMENTS 4,572,230 A * 2/1986 Mirabile .................. B67D 1/07 222/400.7
6,207,046 B1 3/2001 Yamashita et al.

(Continued)

FOREIGN PATENT DOCUMENTS

| | | |
|---|---|---|
| CN | 1248219 | 3/2000 |
| CN | 1444541 | 9/2003 |

(Continued)

OTHER PUBLICATIONS

Supplementary European Search Report received in connection with European Application No. 18741410.7 dated Aug. 11, 2020, 6 pages.

(Continued)

*Primary Examiner* — J C Jacyna
(74) *Attorney, Agent, or Firm* — Meunier Carlin & Curfman LLC

(57) ABSTRACT

Systems and methods are disclosed herein that include providing a beverage dispensing machine with a cleaning system comprising a first water branch and a second water branch connected in fluid communication with a three-way valve, a cleaning supply connected in fluid communication with the second water branch via a pump, and a nozzle. The three-way valve may be operated in a "dispensing mode" to provide a flow of at least one of water and carbonated water through the first water branch and a flowpath of the three-way valve to the nozzle, and operated in a "cleaning mode"

(Continued)

to provide a flow of a cleaner, and optionally a flow of at least one of water and carbonated water, through the second water branch and a secondary flowpath of the three-way valve to the nozzle to clean the nozzle and/or a drain of the beverage dispensing machine.

17 Claims, 11 Drawing Sheets

Related U.S. Application Data

(60) Provisional application No. 62/448,074, filed on Jan. 19, 2017.

(56) References Cited

U.S. PATENT DOCUMENTS

| | | | |
|---|---|---|---|
| 6,544,336 | B1 | 4/2003 | Lopes |
| 6,694,748 | B2 | 2/2004 | Sergio et al. |
| 9,415,992 | B2 | 8/2016 | Ryan et al. |
| 10,822,219 | B2 * | 11/2020 | Katz ..................... B08B 9/0325 |
| 2003/0024598 | A1 * | 2/2003 | Colombo ................ F16L 47/03 141/91 |
| 2005/0183744 | A1 * | 8/2005 | Staub .................... B08B 9/0321 134/26 |
| 2006/0131336 | A1 | 6/2006 | Schroeder et al. |
| 2007/0205220 | A1 | 9/2007 | Rudick et al. |
| 2007/0267441 | A1 | 11/2007 | Van Opstal et al. |
| 2009/0014464 | A1 | 1/2009 | Adbelmoteleb |
| 2010/0089948 | A1 | 4/2010 | Ziesel et al. |
| 2010/0242497 | A1 | 9/2010 | Bertone |
| 2011/0073618 | A1 | 3/2011 | Anderson et al. |
| 2013/0104742 | A1 * | 5/2013 | Deo ......................... B67D 1/07 99/275 |
| 2013/0104743 | A1 | 5/2013 | Deo et al. |
| 2013/0140328 | A1 * | 6/2013 | Gates ................... B67D 1/0892 134/22.18 |
| 2013/0209639 | A1 | 8/2013 | Larson et al. |
| 2015/0298956 | A1 | 10/2015 | Rudick et al. |
| 2015/0315006 | A1 | 11/2015 | Ziesel |
| 2017/0057805 | A1 | 3/2017 | Bischel |
| 2017/0349422 | A1 * | 12/2017 | Baldée .................... A47J 31/60 |
| 2018/0086620 | A1 * | 3/2018 | Smith ...................... B67D 1/07 |
| 2019/0276297 | A1 | 9/2019 | Tewari |

FOREIGN PATENT DOCUMENTS

| | | |
|---|---|---|
| EP | 2025268 | 7/2009 |
| KR | 10-1177811 | 8/2012 |
| WO | 2000/053346 | 9/2000 |
| WO | 2008/147200 | 12/2008 |
| WO | 2013/067003 | 5/2013 |
| WO | 2015/103542 | 7/2015 |

OTHER PUBLICATIONS

International Preliminary Report on Patentability, issued by the International Bureau of WIPO in PCT Application No. PCT/US2018/014384 on Aug. 1, 2019. 8 pages.

International Search Report and Written Opinion. Issued by the International Searching Authority (KR) in application No. PCT/US2018/014384 on Jun. 20, 2018. 12 pages.

Office Action issued for Chinese Application No. 201880013912.9, dated Sep. 14, 2020. English Translation included.

* cited by examiner

AUTOMATED CLEANING SYSTEM FOR BEVERAGE DISPENSING MACHINE

CROSS-REFERENCE TO RELATED APPLICATIONS

This application is a continuation of U.S. application Ser. No. 16/479,472 filed Jul. 19, 2019, which is a national stage application filed under 35 U.S.C. § 371 of PCT/US2018/014384 filed Jan. 19, 2018, which claims the benefit of U.S. Provisional Patent Application Ser. No. 62/448,074 filed Jan. 19, 2017, the disclosures of which are expressly incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Beverage dispensing machines are seemingly common in venues such as full service restaurants, fast food restaurants, convenience stores, etc. Many beverage dispensing machines mix the ingredients of a beverage just prior to and/or as the ingredients are dispensed into a container. Such ingredients often contain sweeteners, syrups, and/or other sugar-laden chemicals that may collect on the components of the beverage dispensing mechanism of a beverage dispensing machine, such as a dispensing nozzle, and/or other components of the beverage dispensing machine, such as a drain cover and/or within the drain itself.

SUMMARY

In some embodiments of the disclosure, an automated cleaning system for a beverage dispensing machine is disclosed as comprising: a first water branch; a second water branch comprising a check valve, each branch connected in fluid communication with a three-way valve; a cleaning supply connected to the second water branch downstream from the check valve via a pump; and a nozzle; wherein the three-way valve is configured to operate in a first mode to prevent a flow of a cleaner from the cleaning supply through the second water branch and allow a flow of a fluid through the first water branch and the three-way valve to the nozzle and operate in a second mode to allow a flow of a cleaner from the cleaning supply through the second water branch and the three-way valve to the nozzle.

In other embodiments of the disclosure, an automated cleaning system for a beverage dispensing machine is disclosed as comprising: a water branch coupled to a nozzle; and a cleaning supply coupled to a pump; wherein the beverage dispensing machine is configured to operate in a first mode to allow a flow of a fluid through the water branch to the nozzle and operate in a second mode to allow a flow of a cleaner from the cleaning supply through the nozzle.

In yet other embodiments of the disclosure, an automated cleaning system for a beverage dispensing machine is disclosed as comprising: a cleaning supply for dispensing a cleaner; a pump coupled to the cleaning supply; and a supply line coupled to at least one drain line; wherein the pump is controlled by a controller to deliver the cleaner from the cleaning supply to the at least one drain line.

BRIEF DESCRIPTION OF THE DRAWINGS

For a more complete understanding of the present disclosure and the advantages thereof, reference is now made to the following brief description, taken in connection with the accompanying drawings and detailed description:

FIG. 10 is a schematic diagram of an automated cleaning system according to yet another embodiment of the disclosure;

DETAILED DESCRIPTION

Figure 1A:
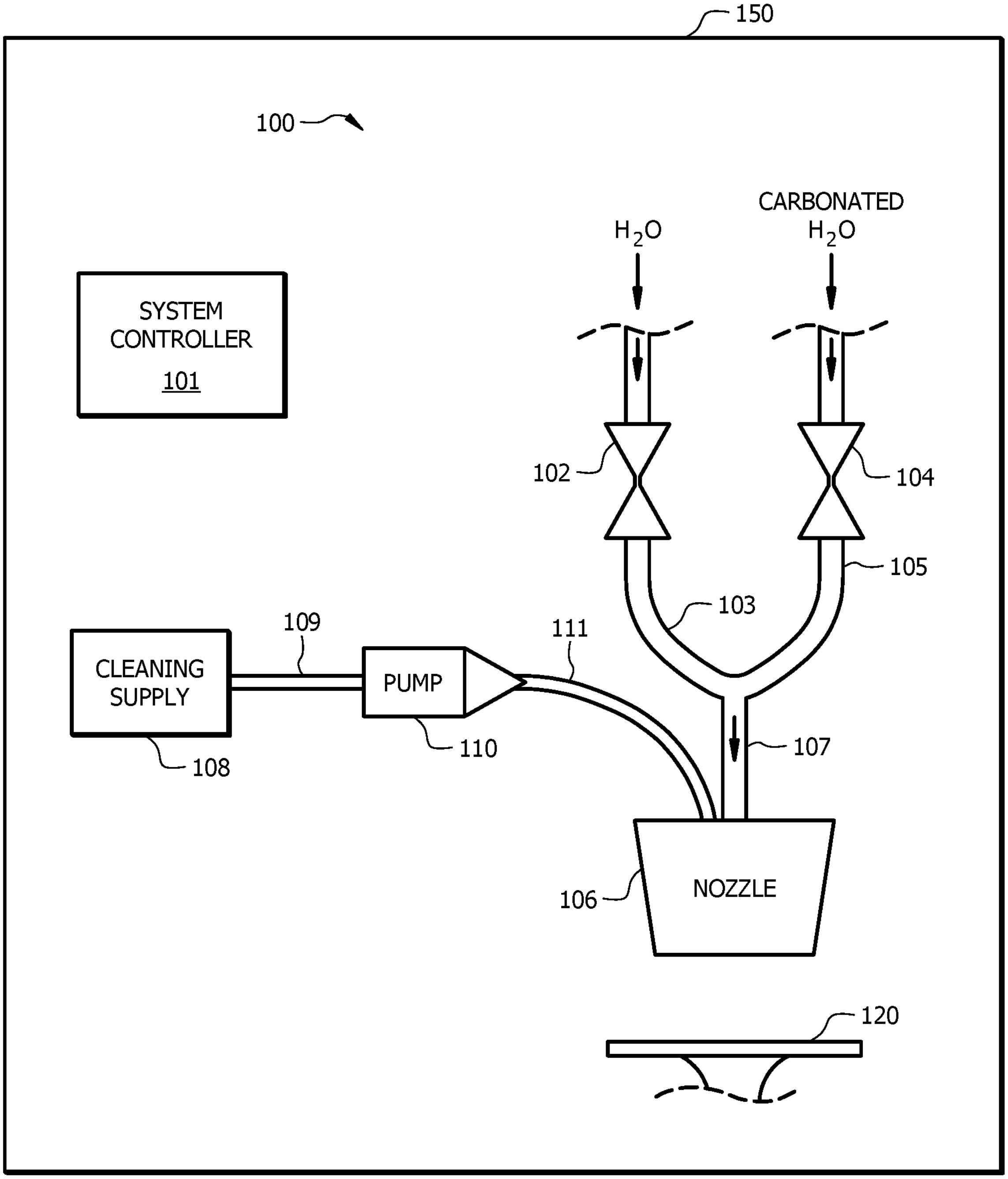
FIG. 1A is a schematic diagram of an automated cleaning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In beverage dispensing machines that mix the ingredients of a beverage just prior to and/or as the ingredients are dispensed into a container, these ingredients, such as sweeteners, syrups, and/or other sugar-laden fluids, may collect on components of a beverage dispensing mechanism of a beverage dispensing machine, such as a dispensing nozzle, and/or other components of the beverage dispensing machine, such as a drain cover and/or within the drain itself. The build-up of these ingredients may result in malfunction of the dispensing mechanism, clogging of the drain, and/or microbiological growth on the dispensing mechanism and/or other components of the beverage dispensing machine. Often, failure of maintenance staff to perform regularly scheduled cleaning procedures, which requires removal of components of the beverage dispensing mechanism and/or other components of the beverage dispensing machine may further contribute to and/or worsen the build-up.

Therefore, the present disclosure provides a cleaning system for a beverage dispensing machine comprising a cleaning supply connected to a beverage dispensing mechanism, such as a nozzle, and/or connected to a drain for the beverage dispensing machine. The automated cleaning system may comprise a three-way valve configured to isolate the cleaner and control the flow of the cleaner, water, and/or carbonated water through the nozzle to clean the nozzle, remove build-up that has collected on the nozzle, and/or eliminate microbiological growth that has formed on the nozzle. In an embodiment, the automated cleaning system also comprises a check valve upstream of the cleaning supply line further isolating the cleaner from micro-ingredients, macro-ingredients, water, carbonated water, and/or other ingredients that may be dispensed through the nozzle to a consumer for consumption.

In some embodiments, the cleaner may comprise a detergent cleaner and/or a sanitizing ingredient. In some embodiments, the cleaner may also comprise an enzyme that does not require the use of water and/or carbonated water and is configured to eliminate a build-up of ingredients, such as so-called "sugar snakes" that form in a drain of a beverage dispensing machine, without the use of water and/or carbonated water. The automated cleaning system disclosed herein may eliminate the need to remove components of the beverage dispensing machine for cleaning. The automated cleaning system disclosed herein may also ensure that regularly-scheduled maintenance, cleaning, and/or disinfecting operations are timely and accurately performed, which may eliminate the need for maintenance staff to perform such operations manually, thereby improving customer and/or consumer satisfaction with the beverage dispensing machine.

Referring now to FIG. 1A a schematic diagram of an automated cleaning system 100 is shown according to an embodiment of the disclosure. The automated cleaning system 100 may generally comprise a component system of a beverage dispensing machine 150 and be installed in the beverage dispensing machine 150 along with other components to provide a flow of a plurality of ingredients (micro-ingredients, macro-ingredients, water, carbonated water, and/or other ingredients) and mix the ingredients prior to and/or simultaneously with dispensing the ingredients into a container. The automated cleaning system 100 comprises a water valve 102, a carbonated water valve 104, a nozzle 106, a cleaning supply 108, and a pump 110. Additionally, as will be discussed later, the automated cleaning system 100 also comprises a system controller 101.

The water valve 102 may comprise a solenoid activated valve that is configured to control the flow of water from a water source through the water valve 102 in each of an open position in which the flow through the water valve 102 remains substantially unrestricted and a closed position in which the flow of water through the water valve 102 is substantially restricted such that substantially no water passes through the water valve 102. Accordingly, the open position may be associated with a maximum flow rate through the water valve 102, while the closed position may be associated with substantially no flow through the water valve 102. However, in other embodiments, the water valve 102 may be operated in a plurality of at least partially open positions to control the flow rate of water through the water valve 102. In operation, when the water valve 102 is operated in the open position, water may flow from the water source, pass through the water valve 102, and flow through a water supply line 103, where the flow of water may enter a universal water line 107 that delivers the water to the nozzle 106.

The carbonated water valve 104 may also comprise a solenoid activated valve that is configured to control the flow of carbonated water from a carbonated water source through the carbonated water valve 104 in each of an open position in which the flow through the carbonated water valve 104 remains substantially unrestricted and a closed position in which the flow of carbonated water through the carbonated water valve 104 is substantially restricted. Accordingly, the open position may be associated with a maximum flow rate through the carbonated water valve 104, while the closed position may be associated with substantially no flow through the carbonated water valve 104. However, in other embodiments, the carbonated water valve 104 may be operated in a plurality of at least partially open positions to control the flow rate of carbonated water through the carbonated water valve 104. In operation, when the carbonated water valve 104 is operated in the open position, carbonated water may flow from the carbonated water source, pass through the carbonated water valve 104, and flow through a carbonated water supply line 105, where the flow of carbonated water may enter the universal water line 107 that delivers the carbonated water to the nozzle 106.

Figure 5:
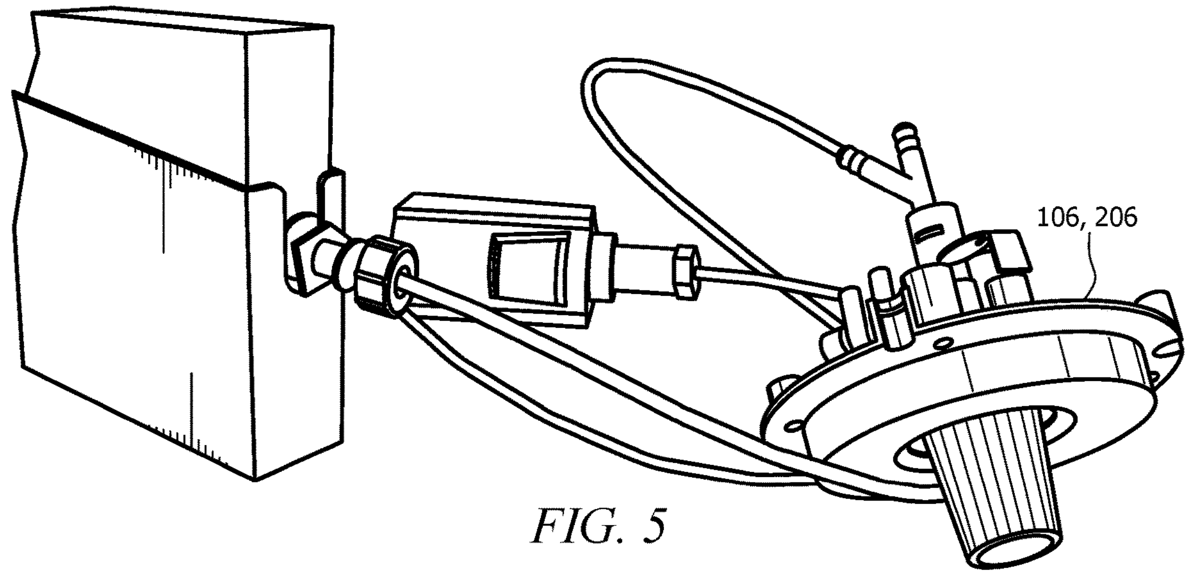
FIG. 5 is an oblique bottom side view of a nozzle according to an embodiment of the disclosure.
Figure 6:
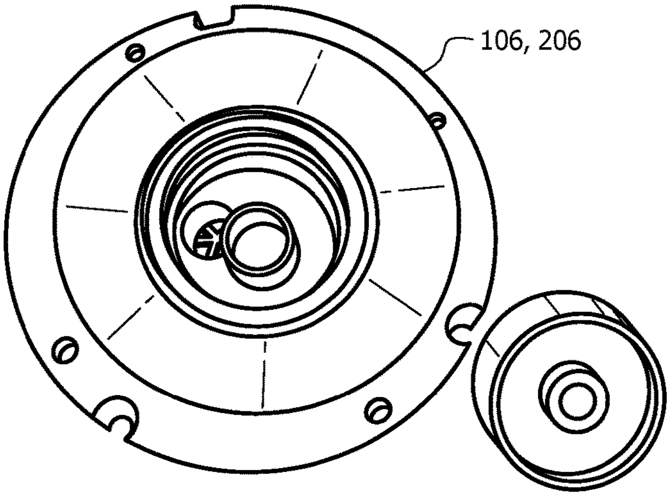
FIG. 6 is an oblique top view of the nozzle of FIG. 5 according to an embodiment of the disclosure.
Figure 7:
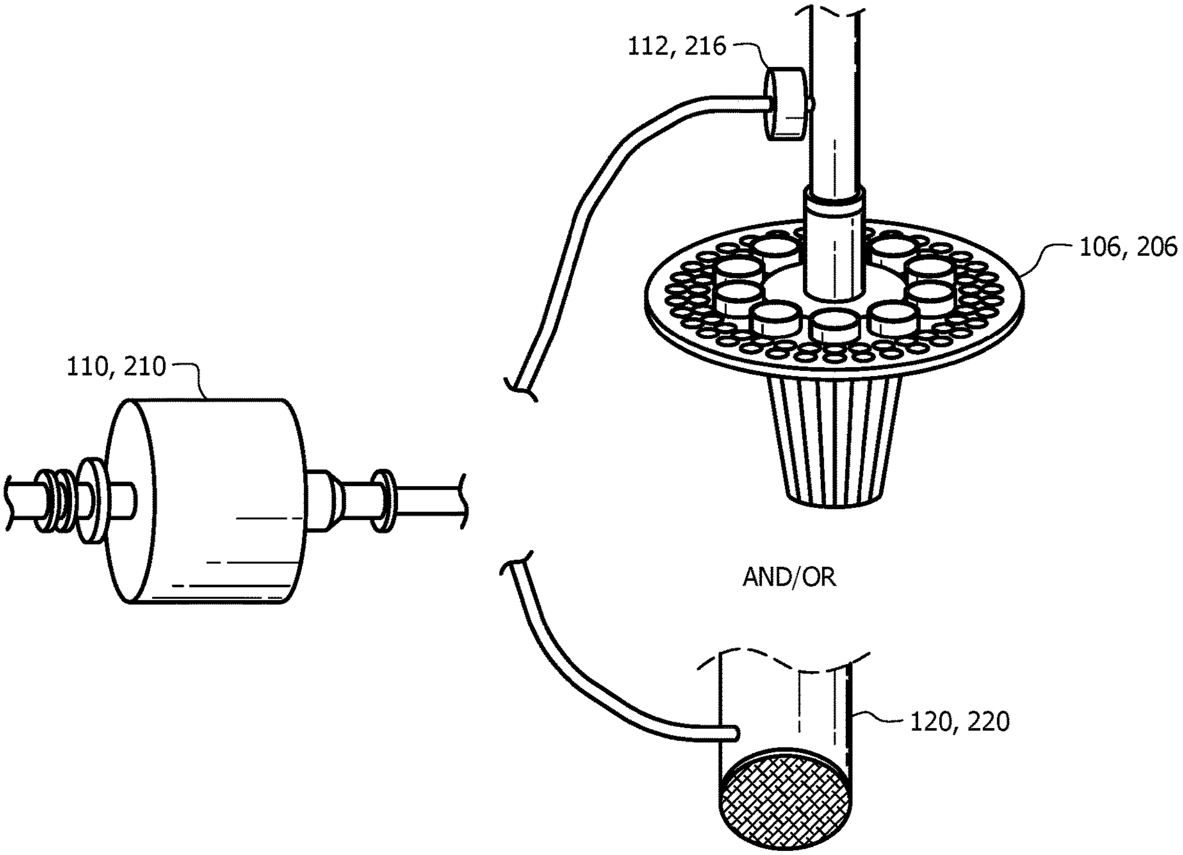
FIG. 7 is a partial schematic of a cleaning system comprising the nozzle of FIGS. 5 and 6 according to an embodiment of the disclosure.

The nozzle 106 may generally comprise a beverage dispensing mechanism configured to receive a flow of a plurality of ingredients (micro-ingredients, macro-ingredients, water, carbonated water, and/or other ingredients) and mix the ingredients prior to and/or simultaneously with dispensing the ingredients into a container. Accordingly, the nozzle 106 may be connected to a plurality of ingredient supplies, such as cleaning supply 108, water via water valve 102, and carbonated water through the carbonated water valve 104, and may be further configured to selectively discharge through the nozzle 106 any of the plurality of ingredients. In some embodiments, the nozzle 106, shown in FIGS. 5-7, may be substantially similar to the dispenser disclosed in U.S. Pat. No. 9,415,992, and/or the nozzle assembly disclosed in U.S. Patent Publication No. 2015/0315006, the disclosures of which are hereby incorporated by reference in their entireties for all intended purposes.

The cleaning supply 108 may generally comprise a replaceable cartridge configured to carry a cleaner. The cleaning supply 108 may comprise a sensor for monitoring a level of the cleaner within the cleaning supply 108. Additionally, in some embodiments, the cleaning supply 108 may also comprise radio frequency identification (RFID) and/or near field communication (NFC) tag for tracking and/or monitoring the cleaning supply 108.

The cleaning supply 108 may generally comprise a cleaner configured to clean and/or sanitize the nozzle 106 and/or other components of the beverage dispensing machine 150. The cleaner may be a liquid or a powder. In an embodiment, the cleaning supply 108 comprises a cleaner configured to mix with water and/or carbonated water to clean and/or sanitize the nozzle 106 and/or a drain 120 of the beverage dispensing machine 150 to eliminate a build-up of ingredients and/or microbiological growth on the components of the beverage dispensing machine 150. In such an embodiment, the cleaning supply 108 may comprise iodine, chlorine, and/or any other suitable food-grade cleaning and/or sanitizing agent. However, in other embodiments, the cleaning supply 108 may comprise an enzyme configured to eliminate a build-up of ingredients, such as so-called "sugar snakes" that form in a drain 120 of the beverage dispensing machine 150, without the use of water and/or carbonated water. Furthermore, while only one cleaning supply 108 is shown, it will be appreciated that the nozzle 106 is configured to receive the supply of a plurality of micro-ingredient supplies. For example, the nozzle 106 may be configured to receive the cleaning supply 108 and one or more micro and/or macro-ingredient supplies. In some embodiments, the automated cleaning system 100 may comprise one cleaning supply 108 comprising a cleaner configured to mix with water and/or carbonated water for cleaning the nozzle 106, and may also comprise an additional cleaning supply 108 comprising an enzyme to eliminate a build-up of ingredients, such as the "sugar snakes," without the use of water and/or carbonated water.

Furthermore, in other embodiments, the nozzle 106 may further comprise a rotary switching mechanism that comprises a plurality of positions similar to the rotary switching mechanism disclosed in U.S. Pat. No. 9,415,992, which is herein incorporated by reference for all intended purposes. When configured in a first position, the rotary switching mechanism may allow each micro-ingredient of a plurality of micro-ingredients to flow via their respective micro-ingredient channels to the nozzle 106. However, when the rotary switching mechanism is configured in a second position, the rotary switching mechanism simultaneously switches all of the micro-ingredient channels from their respective micro-ingredient sources to the cleaning supply 108. As such, the cleaner from the cleaning supply 108 may flow through the nozzle 106 through the multiple micro-ingredient channels of the nozzle 106 to clean and/or sanitize the multiple micro-ingredient channels of the nozzle 106 and/or the nozzle 106 itself.

In some embodiments, instead of being a micro-ingredient supply flowing through a micro line, the cleaning supply 108 may be a macro-ingredient supply and the cleaner may flow through any macro line going to the nozzle 106. Further, in some embodiments, the cleaning supply 108 may be located outside of the beverage dispensing machine 150.

The pump 110 may generally comprise an electrically and/or mechanically activated pump. The pump 110 is configured to deliver a cleaner from the cleaning supply 108 to the nozzle 106. More specifically, when the cleaning supply 108 is activated, the pump 110 may draw the cleaner from the cleaning supply 108 through a line 109, pass the cleaner through the pump 110 and deliver the cleaner via a supply line 111 into a port of the nozzle 106. Within the nozzle 106 and/or just prior to exiting the nozzle, the cleaner from the cleaning supply 108 may selectively mix with an incoming flow of water when the water valve 102 is configured to provide a flow of water to the nozzle 106 and/or carbonated water when the carbonated water valve 104 is configured to provide a flow of carbonated water to the nozzle 106.

The pump 110 may be a positive displacement pump such as a piston pump, gear pump, nutating pump, diaphragm pump, or the like. Each cycle of the pump 110 may dispense a predetermined amount of the cleaning supply 108. In operation, the pump 110 may receive instructions to cycle a predetermined number of times or for a predetermined length of time during a cleaning operation. After completion of a cleaning operation, the beverage dispensing system 150 may determine a total amount of cleaner dispensed from the cleaning supply 108 and determine a remaining amount of cleaner left in the cleaning supply 108. The beverage dispensing system 150 may write the remaining amount of cleaner to the RFID or NFC tag on the cleaning supply 108.

Figure 1B:
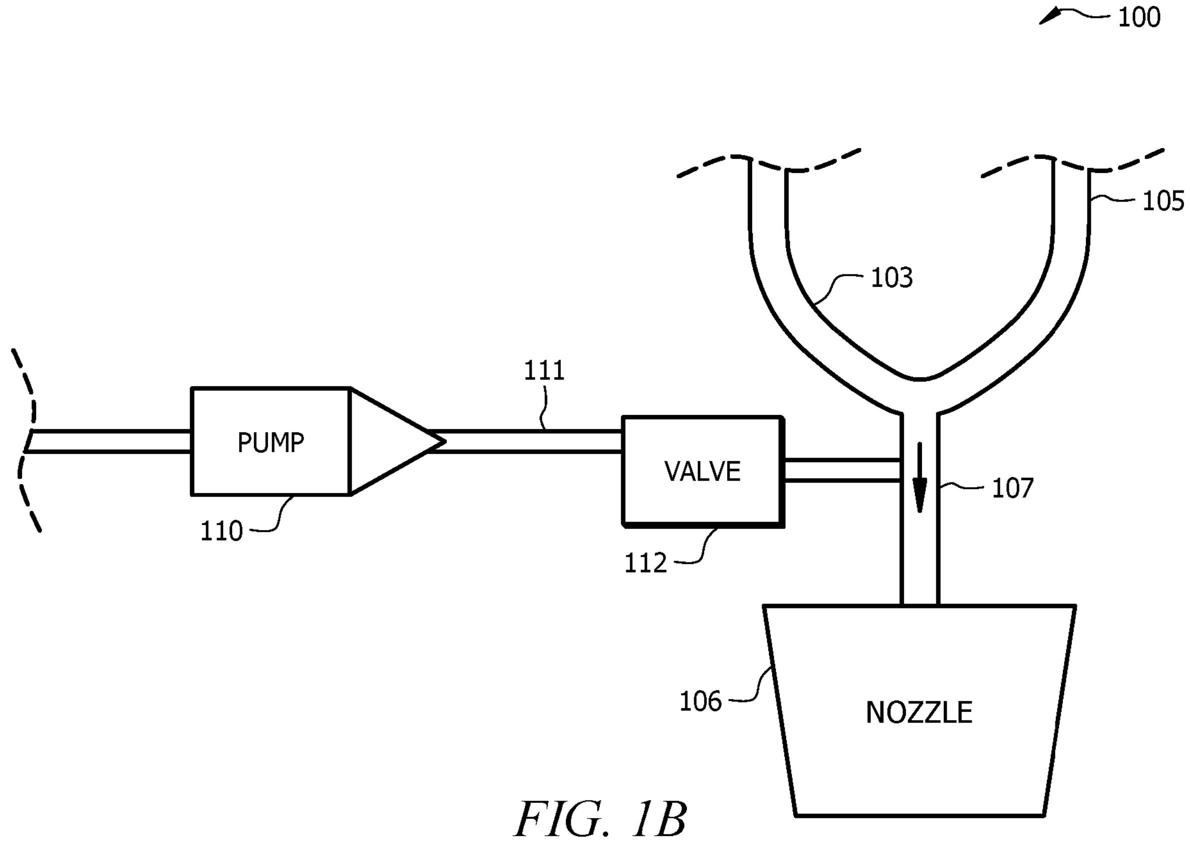
FIG. 1B is a schematic diagram of an automated cleaning system according to another embodiment of the disclosure.

In some embodiments, as illustrated in FIG. 1B, the supply line 111 may be connected directly to the universal supply line 107 through a valve 112, which may be a check valve, a manual binary valve, or an electrically actuated binary valve. Thus, in such embodiments, the pump 110 may draw the cleaner from the cleaning supply 108 through a line 109, pass the cleaner through the pump 110, through the valve 112, and deliver the cleaner via the supply line 111 directly into the universal water line 107, where the cleaner may be selectively mixed with a flow of at least one of water and/or carbonated water for cleaning the nozzle 106 and/or the drain 150. Alternatively, no water and/or carbonated water may be used.

In some embodiments, as illustrated in FIG. 1B, the supply line 111 may be connected directly to the universal supply line 107 through a valve 112, which may be a check valve, a manual binary valve, or an electrically actuated binary valve. Thus, in such embodiments, the pump 110 may draw the cleaner from the cleaning supply 108 through a line 109, pass the cleaner through the pump 110, through the valve 112, and deliver the cleaner via the supply line 111 directly into the universal water line 107, where the cleaner may be selectively mixed with a flow of at least one of water and/or carbonated water for cleaning the nozzle 106 and/or the drain 120. Alternatively, no water and/or carbonated water may be used.

Figure 1C:
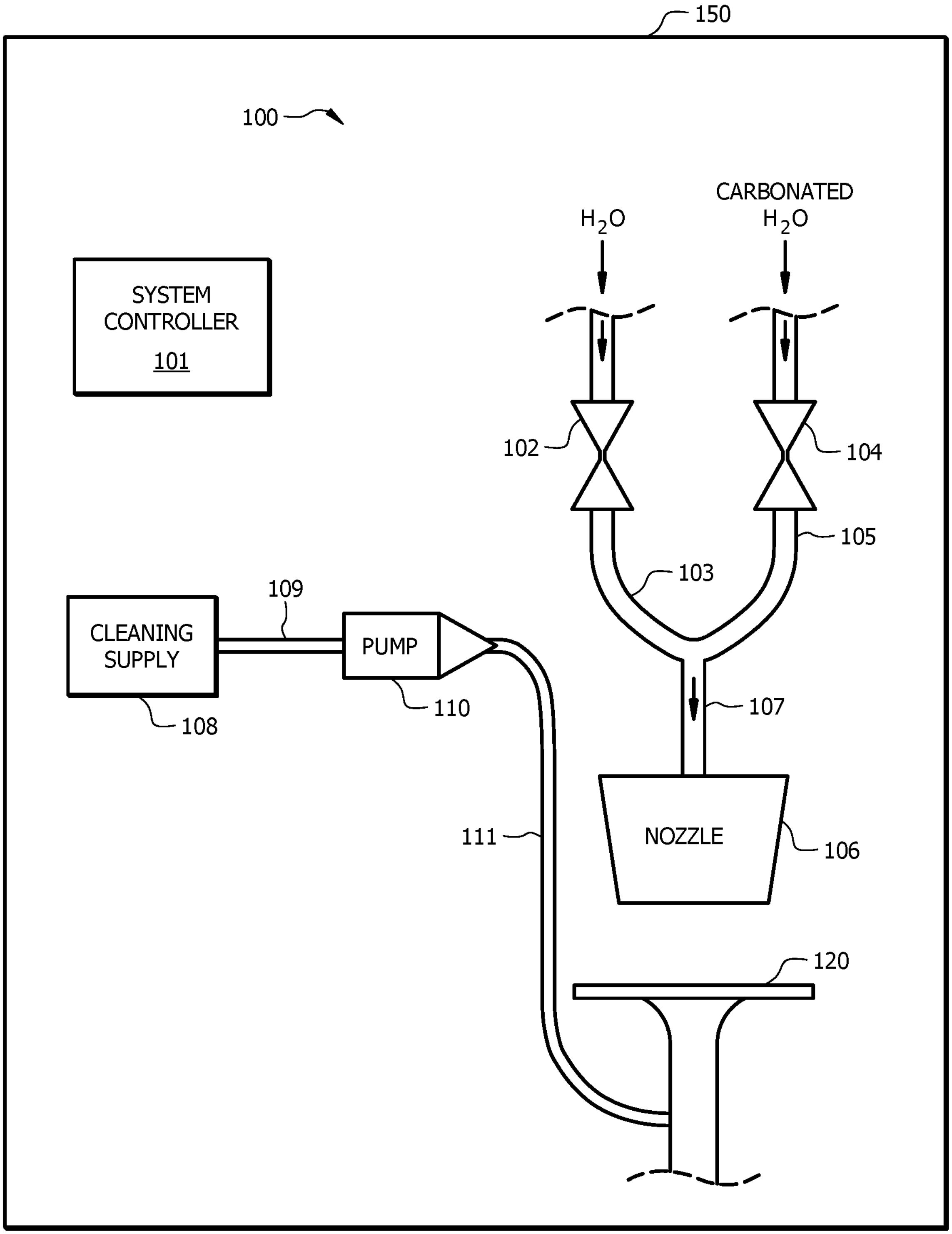
FIG. 1D is a schematic diagram of an automated cleaning system according to an alternative embodiment of the disclosure.
Figure 1D:
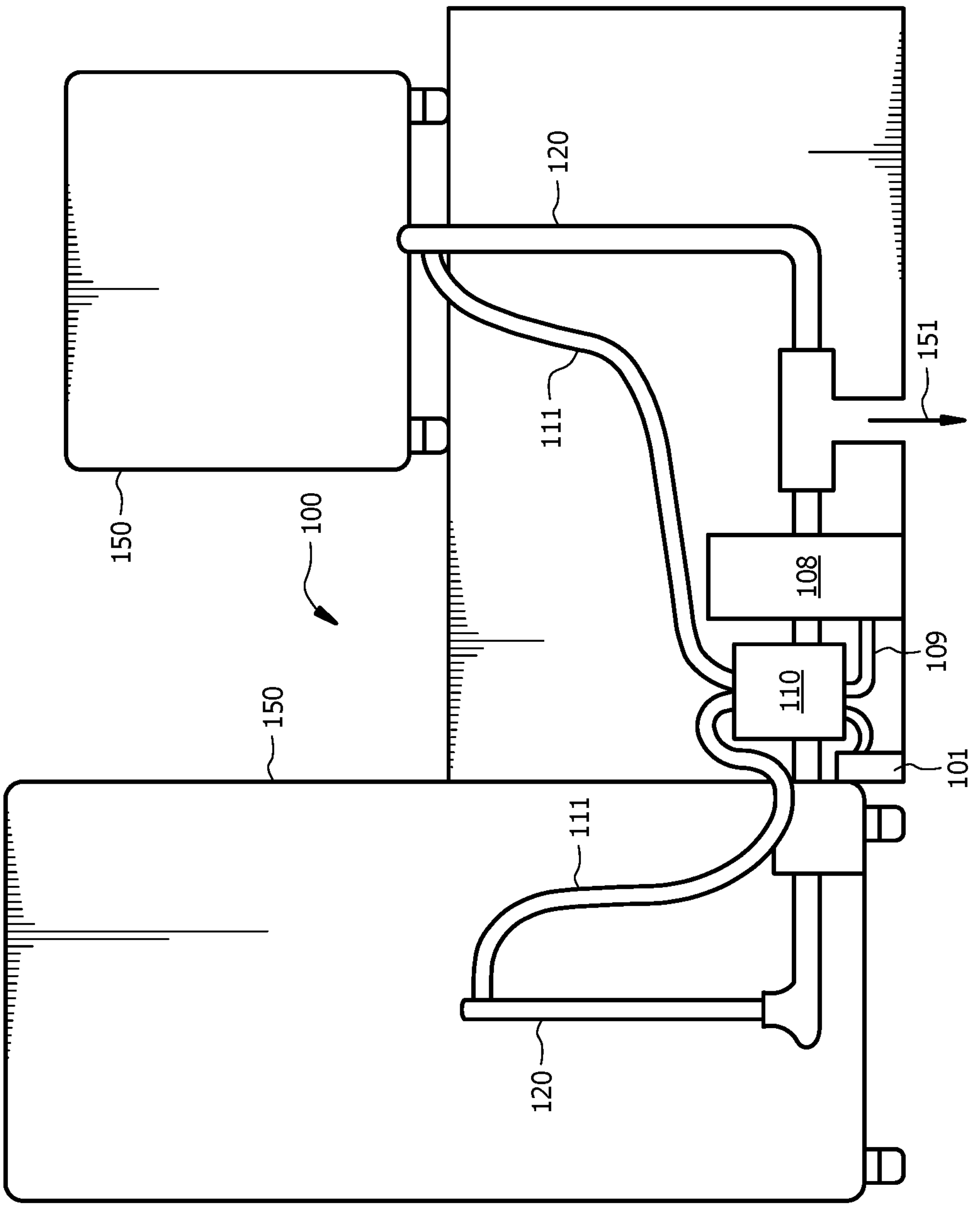

In some embodiments, as illustrated in FIG. 1C, the supply line 111 may be connected directly to the drain 120 (e.g., via a drain line) of the beverage dispensing machine 150 to clean and/or sanitize the drain 120 of the beverage dispensing machine 150 in order to eliminate a build-up of ingredients and/or microbiological growth in the drain 120 and/or on an inner surface of a drain 120 conduit of the beverage dispensing machine 150. However, in other embodiments, as shown in FIG. 1D, multiple supply lines 111 may be connected to multiple drains 120 of multiple beverage dispensing machines 150. Further, the multiple drains 120 may also be connected in fluid communication with and/or routed to a main floor drain 151. Accordingly, in some embodiments, a cleaning system 100 may be configured to clean and/or sanitize multiple drains 120 of the beverage dispensing machine 150 and/or a main floor drain 151 in order to eliminate a build-up of ingredients and/or microbiological growth in the drains 120, the main floor drain 151 and/or on an inner surface of the drain 120 conduits of the beverage dispensing machine 150.

The system controller 101 may be configured to operate the automated cleaning system 100 in the "cleaning mode," during periods of time when no other beverages are being dispensed through the nozzle 106. The system controller 101 may comprise an internal timer, schedule, and/or other timing device or method, such that the system controller 101 operates the automated cleaning system 100 in the "cleaning mode" during off hours when the beverage dispensing machine 150 is not in use. In an embodiment, the system controller 101 is configured to automatically operate the automated cleaning system 100 in the "cleaning mode" based on a schedule stored in the system controller 101 and/or a timer associated with the system controller 101. For example, the system controller 101 may operate the automated cleaning system 100 in the "cleaning mode" each night at about 2 a.m. when a business containing a beverage dispensing machine 150 comprising the automated cleaning system 100 is closed. However, in other embodiments, the system controller 101 may be configured to operate the automated cleaning system 100 in the "cleaning mode" based on a user input via a user interface of the system controller 101 and/or an external device configured to communicate with the system controller 101 via WiFi, Bluetooth, RFID, NFC, and/or any other wireless and/or wired communication protocol. In yet other embodiments, the "cleaning mode" of the automated cleaning system 100 may be instituted manually by activation of a switch, button, RFID interface, NFC interface, GUI interface, and/or any other suitable input via the system controller 101 of the automated cleaning system 100. In still other embodiments, the "cleaning mode" of the automated cleaning system 100 may be instituted as part of normal rebooting and/or reporting operations performed by the beverage dispensing system 150, such as when the beverage dispensing system 150 is reporting daily dispensing statistics to a back end server. Furthermore, in yet other alternative embodiments, the system controller 101 may be configured to prevent the flow of the cleaner without water and/or carbonated water.

When the automated cleaning system 100 is configured to operate in the "cleaning mode," the system controller 101 may configure the water valve 102 and/or the carbonated water valve 104 in the open position to allow the flow of water and/or carbonated water, respectively, to flow to the nozzle 106. In some embodiments, the water valve 102 may be configured in the open position so that water from the water source may pass through the water valve 102, through the water supply line 103, through the universal water line 107, and to the nozzle 106. In other embodiments, the carbonated water valve 104 may be configured in the open position so that carbonated water from the carbonated water source may pass through the carbonated water valve 104, through the carbonated water supply line 105, through the universal water line 107, and to the nozzle 106. However, in alternative embodiments, both the water valve 102 and the carbonated water valve 104 may be configured in an at least partially open position to supply a mixture of water and carbonated water through the universal water line 107 and to the nozzle 106. Furthermore, in the case of a cleaning enzyme in the cleaning supply 108, neither water nor carbonated water may be necessarily used.

Additionally, the system controller 101 may also activate the pump 110 to provide a flow of a cleaner from the cleaning supply 108 through the line 109, through the pump 110, and through the supply line 111 to a port of the nozzle 106. Within the nozzle 106, the water and/or the carbonated water passing through valves 102, 104, respectively, may mix with the cleaner to form a cleaning solution that may clean and/or sanitize the nozzle 106, remove build-up that has collected on the nozzle 106, and/or eliminate microbiological growth that has formed on the nozzle 106. Further, after the cleaning solution passes through the nozzle 106, the cleaning solution may also contact a drain 120 cover and/or a drain 120 of the beverage dispensing machine 150, where the cleaning solution may further clean, remove build-up that has collected, and/or eliminate microbiological growth that has formed on the drain 120 cover and/or the drain 120 of the beverage dispensing machine 150.

Still further, in some embodiments, the automated cleaning system 100 may comprise one cleaning supply 108 comprising a cleaner configured to mix with water and/or carbonated water for cleaning the nozzle 106, and may also comprise an additional cleaning supply 108 comprising an enzyme to eliminate a build-up of ingredients in the drain 120 of the beverage dispensing machine 150, such as the "sugar snakes," without the use of water and/or carbonated water. In such instances, the cleaning supply 108 comprising a cleaner may be activated first to clean the nozzle 106, and the additional cleaning supply 108 comprising an enzyme may be activated thereafter while ceasing the flow of water and/or carbonated water by closing the water valve 102 and/or the carbonated water valve 104, respectively. However, in other embodiments, the enzyme may be activated first, and the cleaner may be activated thereafter. Still further, each of the cleaner and the enzyme may each be activated based on a schedule stored by the system controller 101 and associated with each of the cleaning supplies 108.

Figure 2:
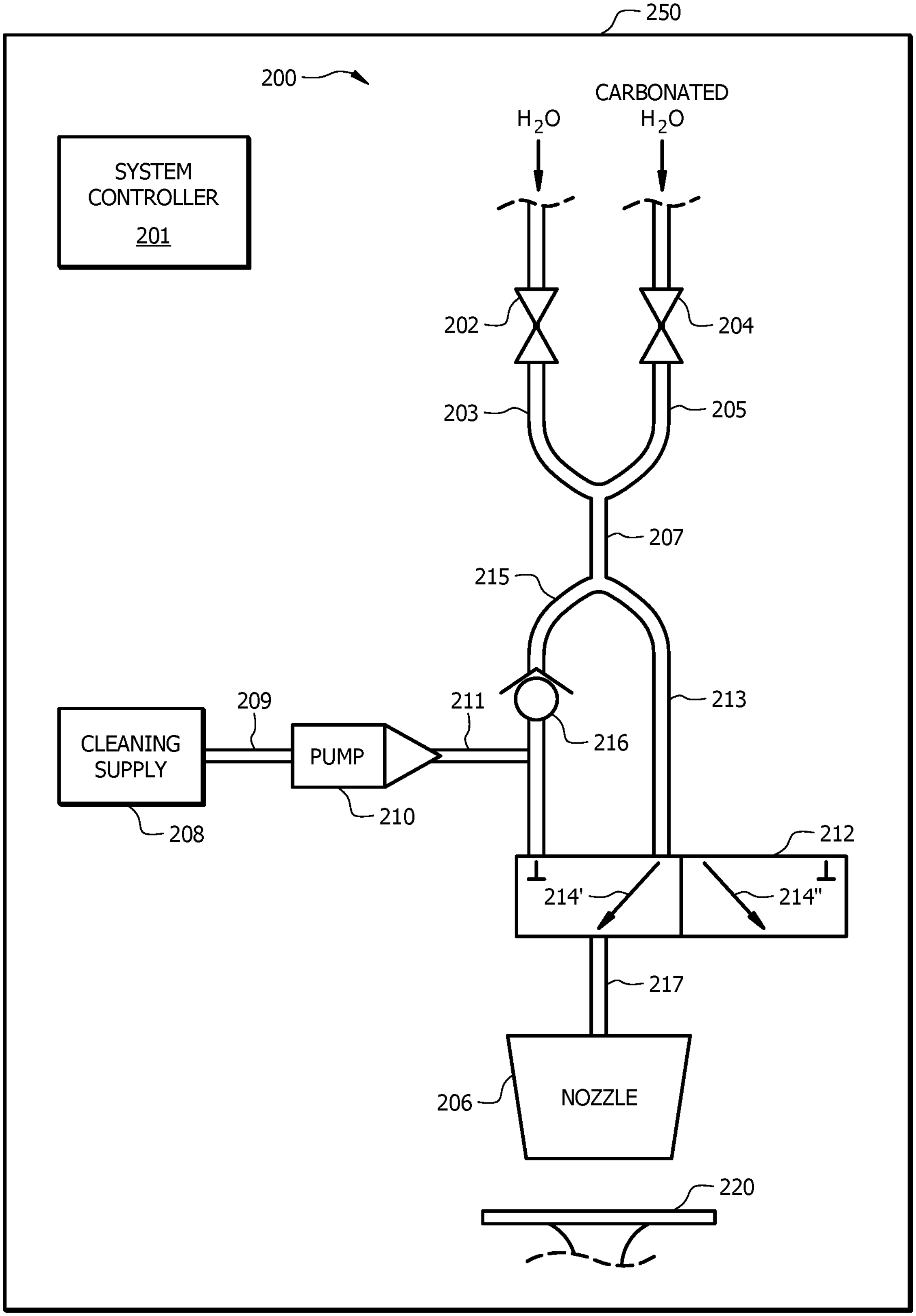
FIG. 2 is a schematic diagram of an automated cleaning system configured in a default mode of operation according to another embodiment of the disclosure.

Referring now to FIG. 2, a schematic diagram of an automated cleaning system 200 configured in a default mode of operation is shown according to another embodiment of the disclosure. Automated cleaning system 200 may be substantially similar to automated cleaning system 100 of FIG. 1A and/or FIG. 1B and comprise a water valve 202, a water supply line 203, a carbonated water valve 204, a carbonated water supply line 205, a nozzle 206, a universal water line 207, a cleaning supply 208, a line 209, a pump 210, and a supply line 211 that may be substantially similar to the water valve 102, the water supply line 103, the carbonated water valve 104, the carbonated water supply line 105, the nozzle 106, the universal water line 107, the cleaning supply 108, the line 109, the pump 110, and the supply line 111 of FIG. 1A and/or FIG. 1B, respectively. Additionally, as will be discussed later, the automated cleaning system 200 also comprises a system controller 201 that may be substantially similar to system controller 101 of automated cleaning system 100 of FIG. 1A.

However, automated cleaning system 200 also comprises a three-way valve 212, and in some embodiments, the automated cleaning system 200 may also comprise a check valve 216. Furthermore, the universal water line 207 of automated cleaning system 200 may split into a dispensing branch 213 and a cleaning branch 215. Each of the dispensing branch 213 and the cleaning branch 215 may be connected in fluid communication with an input of the three-way valve 212, and a main supply line 217 may connect an output of the three-way valve 212 with the nozzle 206. Additionally, the supply line 211 may be connected in fluid communication with the cleaning branch 215 between the universal water line 207 and the three-way valve 212. In embodiments comprising the check valve 216, the supply line 211 may be connected in fluid communication with the cleaning branch 215 between the check valve 216 and the three-way valve 212 such that the check valve 216 is disposed upstream with respect to a flow of water and/or carbonated water through the automated cleaning system 200. Accordingly, the check valve 216 may be configured to prevent the flow of a cleaner from the cleaning supply 208 from flowing upstream towards the universal water line 207.

As shown in FIG. 2, the automated cleaning system 200 is configured in a default mode of operation. The default mode of operation may be a so-called "dispensing mode" where the automated cleaning system 200 is configured to dispense beverages through the nozzle 206 into a container. In the "dispensing mode," the three-way valve 212 may be configured to provide a flow path 214' through the three-way valve 212 such that water and/or carbonated water may pass through the water valve 202 and/or the carbonated water valve 204, respectively, flow through the universal water line 207, through the dispensing branch 213, and pass through the flow path 214' of the three-way valve 212 to the main supply line 217 and through the nozzle 206. Further, when the automated cleaning system 200 is configured in the "dispensing mode," the three-way valve 212 may prevent flow of water, carbonated water, and/or a cleaner from the cleaning supply 208 from passing through the cleaning branch 215 and the three-way valve 212 and into the nozzle 206. Accordingly, the cleaning branch 215 may receive substantially no flow there through. In the "dispensing mode," the cleaner is isolated from the dispensing branch 213 by the check valve 216 in the upstream direction and by the three-way valve 212 in the downstream direction.

In addition, when configured in the "dispensing mode," the nozzle 206 may also be connected to a plurality of micro-ingredient supplies and/or macro-ingredient supplies and be further configured to selectively discharge any of the plurality of micro-ingredients and/or macro-ingredients, water, carbonated water, and/or other ingredient, simultaneously in a manner substantially similar to that of automated cleaning system 100 of FIG. 1A. In some embodiments, the nozzle 206, shown in FIGS. 5-7, may also be substantially similar to the dispenser disclosed in U.S. Pat. No. 9,415,992 and/or the nozzle assembly disclosed in U.S. Patent Publication No. 2015/0315006, the disclosures of which are hereby incorporated by reference in their entireties for all intended purposes. Thus, in operation of the automated cleaning system 200 in the "dispensing mode," water from the water valve 202 and/or carbonated water from the carbonated water valve 204 be dispensed into the nozzle 206, where the water and/or carbonated water may mix with other micro-ingredients and/or macro-ingredients and be dispensed through the nozzle 206 into a container for a consumer.

Figure 3:
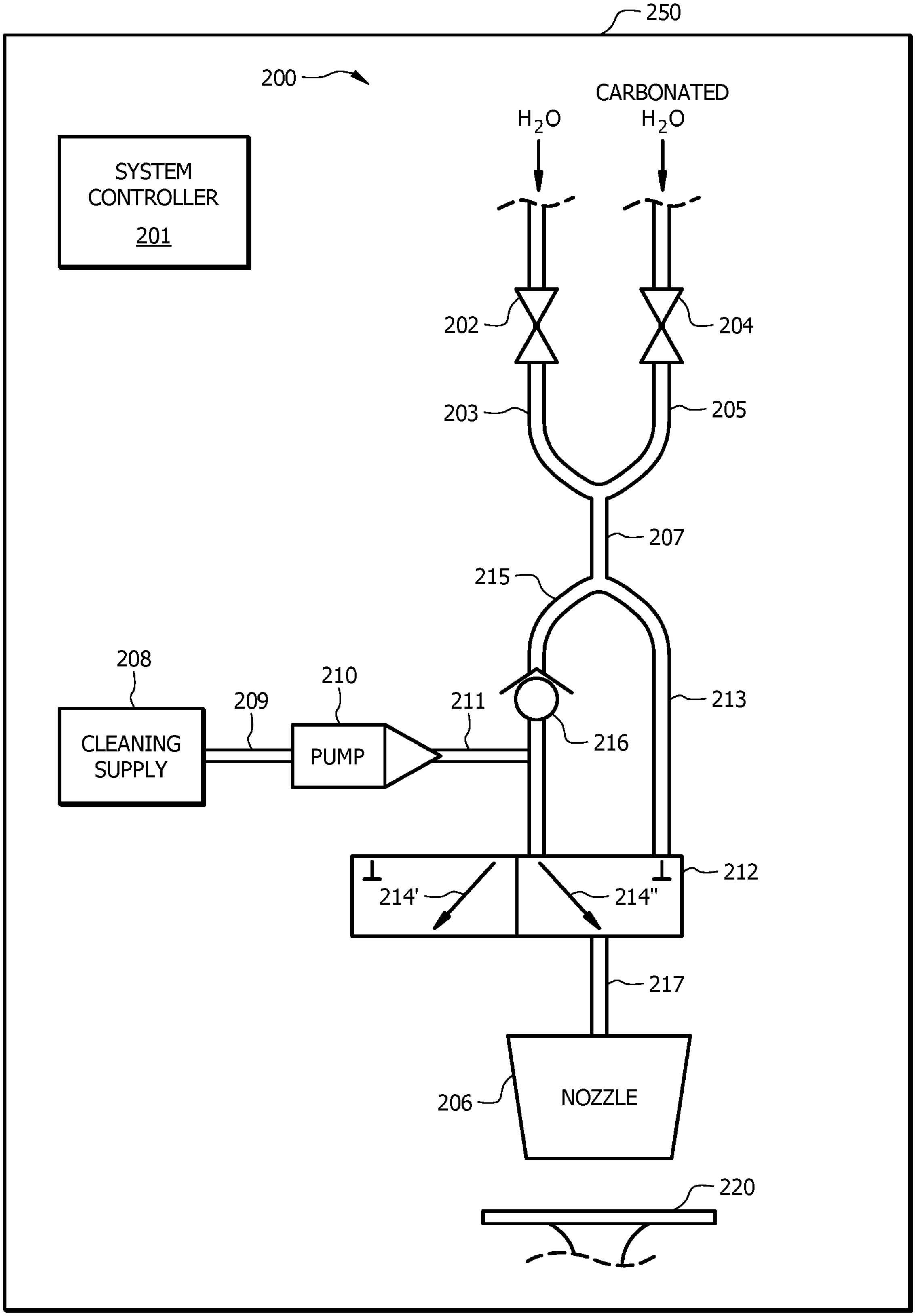
FIG. 3 is a schematic diagram of the automated cleaning system of FIG. 2 configured in an alternative mode of operation according to an embodiment of the disclosure.

Referring now to FIG. 3, a schematic diagram of the automated cleaning system 200 of FIG. 2 configured in an alternative mode of operation is shown according to an embodiment of the disclosure. The automated cleaning system 200 may generally comprise a component system of a beverage dispensing machine 250. The alternative mode of operation may be a so-called "cleaning mode" where the automated cleaning system 200 is configured to dispense a cleaner from the cleaning supply 208 through the nozzle 206. In the "cleaning mode," the three-way valve 212 may be configured by the system controller 201 to provide a secondary flow path 214" through the three-way valve 212 such that water and/or carbonated water may pass through the water valve 202 and/or the carbonated water valve 204, respectively, flow through the universal water line 207, through the cleaning branch 215, through the check valve 216, and pass through the secondary flow path 214" of the three-way valve 212 to the main supply line 217 and through the nozzle 206.

Additionally, in the "cleaning mode," the system controller 201 may activate the pump 210 to provide a flow of the cleaner from the cleaning supply 208 by drawing a cleaner from the cleaning supply 208 through the line 209, pass the cleaner through the pump 210, and deliver the cleaner via the supply line 211 into the cleaning branch 215 at a location downstream from the check valve 216, where the cleaner from the cleaning supply 208 may mix with a flow of water and/or carbonated water to form a cleaning solution that may clean the nozzle 206, remove build-up that has collected on the nozzle 206, and/or eliminate microbiological growth that has formed on the nozzle 206. Further, after the cleaning solution passes through the nozzle 206, the cleaning solution may also contact a drain 220 cover and/or a drain 220 of the beverage dispensing machine 250, where the cleaning solution may further clean, remove build-up that has collected, and/or eliminate microbiological growth that has formed on the drain 220 cover and/or the drain 220 of the beverage dispensing machine 250. However, in the case of a cleaning enzyme in the cleaning supply 208, neither water nor carbonated water may be necessarily used. Further, when the automated cleaning system 200 is configured in the "cleaning mode," the three-way valve 212 may also prevent flow of water and/or carbonated water from passing through the dispensing branch 213, the three-way valve 212, and into the nozzle 206. Accordingly, the dispensing branch 213 may receive substantially no flow therethrough.

The system controller 201 may generally comprise a user interface configured to control operation of the automated cleaning system 200 and configure the automated cleaning system 200 in each of the "dispensing mode" and the "cleaning mode." In some embodiments, the system controller 201 may also employ control architecture substantially similar to the control architecture disclosed in PCT Patent Application Publication No. WO 2015/103,542, the disclosure of which is hereby incorporated by reference in its entirety for all intended purposes to effect operation of the automated cleaning system 200. The system controller 201 may be configured to operate the automated cleaning system 200 in the "cleaning mode," during periods of time when no other beverages are being dispensed through the nozzle 206. In an embodiment, the system controller 201 comprises an internal timer, schedule, and/or other timing device or method, such that the system controller 201 operates the automated cleaning system 200 in the "cleaning mode" during off hours when the beverage dispensing machine 250 is not in use. The system controller 201 may be configured to automatically operate the automated cleaning system 200 in the "cleaning mode" based on a schedule stored in the system controller 201 and/or a timer associated with the system controller 201. In other embodiments, the system controller 201 may be configured to operate the automated cleaning system 200 in the "cleaning mode" based on a user input via a user interface of the system controller 201 and/or an external device configured to communicate with the system controller 201 via WiFi, Bluetooth, RFID, NFC, and/or any other wireless and/or wired communication protocol. In yet other embodiments, the "cleaning mode" of the automated cleaning system 200 may be instituted manually by activation of a switch, button, RFID interface, NFC interface, GUI interface, and/or any other suitable input via the system controller 201 of the automated cleaning system 200.

In some embodiments, when the system controller 201 configures the automated cleaning system 200 in the "cleaning mode," the system controller 201 may open at least one of the water valve 202 and/or the carbonated water valve 204 to provide a flow of water and/or carbonated water, respectively, simultaneously with activation of the cleaner from the cleaning supply 208. However, in other embodiments, the system controller 201 may open at least one of the water valve 202 and/or the carbonated water valve 204 to provide a flow of water and/or carbonated water, respectively, prior to activating the cleaner from the cleaning supply 208 to "pre-flush" the nozzle 206 and/or other components of the beverage dispensing machine 250. Thus, the automated cleaning system 200 may be configured to first pre-flush the nozzle 206 for a predetermined time period, and activate the cleaner from the cleaning supply 208 at the expiration of the predetermined time period while continuing the flow of water and/or carbonated water through the nozzle 206. In some embodiments, the pre-flush predetermined time period may be determined by the system controller 201. Additionally, in the case of an enzyme that requires no additional water and/or carbonated water, a pre-flush operation may be staged in conjunction with the activation of the enzyme within the cleaning supply 208. As such, the pre-flush operation may be enabled for a pre-determined time period, and upon expiration of the predetermined time period, the enzyme within the cleaning supply 208 may be activated while the pre-flush flow of water may be simultaneously ceased.

Activation of the cleaner from the cleaning supply 208 during the "cleaning mode" may also be enabled for a predetermined period of time. In some embodiments, the predetermined period of time may be a function of the strength and/or concentration of the cleaner when mixed with the water and/or carbonated water, a function of the time interval between "cleaning mode" operations, a function of the frequency of use of the beverage dispensing machine 250, a function of a size of the nozzle 206, a drain 220, and/or other components of the beverage dispensing machine 250, and/or a function of any other operating characteristics of the beverage dispensing machine 250. For example, in some embodiments, the cleaner from the cleaning supply 208 may be activated through the automated cleaning system 200 for at least about 2 minutes. However, it will be appreciated that any time interval may selected and/or pre-programmed within the system controller 201.

Furthermore, in some embodiments, the system controller 201 may be configured to cease activation of the cleaner at the expiration of a predetermined time period associated with the cleaner while continuing the flow of water and/or carbonated water through the automated cleaning system 200 to provide a "post-flush" operation. The post-flush operation may ensure that no cleaner remains in the cleaning branch 215 downstream from the check valve 216, the secondary flow path 214", the main supply line 217, and/or the nozzle 216. Accordingly, the post-flush operation may further ensure that no cleaner remains in the automated cleaning system 200, such that when the automated cleaning system 200 is reconfigured in the "dispensing mode" of FIG. 2, no cleaner remains in the main supply line 217 and/or the nozzle 206 that may be dispensed into a consumer's container. The post-flush operation may be enabled for a predetermined time period. In some embodiments, the post-flush operation may be enabled for a substantially similar predetermined time period as the pre-flush operation. However, in other embodiments, the post-flush operation may be enabled for a different predetermined time period than the pre-flush operation. Furthermore, in the case of an enzyme as the cleaning agent that requires no water and/or carbonated water, a post-flush operation may also be enabled to ensure that no residual enzyme remains in the automated cleaning system 200 that may be dispensed into a consumer's container. If the cleaning cycle has been disrupted (e.g., due to power loss or user abort), the system controller 101 may automatically flush the nozzle 106 with water and/or carbonated water before allowing a drink to be poured for consumer consumption.

It will be appreciated that the pump 210 may be configured to supply the cleaner in the "cleaning mode" at a flow rate that is predetermined by the system controller 201. In some embodiments, the flow rate of the cleaner may be determined as a result of a flow rate of the water and/or the carbonated water through the automated cleaning system 200 to ensure a cleaning mixture comprising an effective concentration to clean the nozzle 206, remove build-up that has collected on the nozzle 206, eliminate microbiological growth that has formed on the nozzle 206, and/or eliminate a build-up of ingredients, such as so-called "sugar snakes" that form in a drain 220 of the beverage dispensing machine 250. Further, in some embodiments, the automated cleaning system 200 may be configured to dispense a predetermined amount of cleaner for each operation in the "cleaning mode." For example, in some embodiments, the pump 210 of the automated cleaning system 200 may be configured to deliver about 2 ounces of cleaner over the predetermined time period for which the cleaner from the cleaning supply 208 is activated.

In some embodiments, the automated cleaning system 200 may be configured with a plurality of cleaners in a corresponding number of cleaning supplies 208. Accordingly, one cleaning supply 208 may comprise a cleaner that requires water and/or carbonated water during activation in the "cleaning mode," such as iodine and/or chlorine, while a second cleaning supply 208 may comprise an enzyme that requires no water and/or carbonated water. In such embodiments, each of the cleaners may be activated during a "cleaning mode." Accordingly, the first cleaner may be activated first to clean the nozzle 206, remove build-up that has collected on the nozzle 206, and/or eliminate microbiological growth that has formed on the nozzle 206, while the second cleaner may be activated thereafter to eliminate a build-up of ingredients that form in a drain 220 of the beverage dispensing machine 250. However, in other embodiments, the enzyme may be activated first, and the cleaner may be activated thereafter. Still further, each of the cleaner and the enzyme may each be activated individually, for a predetermined time, and/or based on a schedule stored by the system controller 201 and associated with each of the cleaning supplies 208.

In one exemplary embodiment, when the system controller 201 configures the automated cleaning system 200 in the "cleaning mode," the system controller 201 may configure the three-way valve 212 to connect the cleaning branch 215 in fluid communication with the main supply line 217 through the secondary flow path 214". The system controller 201 may further open at least one of the water valve 202 and the carbonated water valve 204 for at least about 30 seconds to provide a pre-flush operation. At the expiration of the pre-flush operation, the system controller 201 may activate the pump 210 to provide a flow of a cleaner from the cleaning supply 208 into the cleaning branch 215 to mix with the flow of water and/or carbonated water. The cleaning solution of the cleaner and the water and/or carbonated water may flow through the "secondary flow path 214" of the three-way valve 212, through the main supply line 217, and through the nozzle 206 for at least about 2 minutes. At the expiration of the cleaning operation, the flow of the cleaner may be stopped, while the flow of water and/or carbonated water may continue to provide a post-flush operation to flush any residual cleaner from the automated cleaning system 200 for a period of at least about 30 seconds. At the expiration of the post-flush operation, the system controller 201 may configure the automated cleaning system 200 in the default "dispensing mode" by adjusting the position of the three-way valve 212 to provide a flow path from the dispensing branch 213 through the flow path 214' of the three-way valve 212, through the main supply line 217, and through the nozzle 206. The system controller 201 may continue to operate the automated cleaning system 200 in the "dispensing mode" until a demand for the "cleaning mode" is acknowledged and/or received by the system controller 201.

It will be appreciated that the automated cleaning system 200 may be configured to clean the nozzle 206, remove build-up that has collected on the nozzle 206, eliminate microbiological growth that has formed on the nozzle 206, and/or eliminate a build-up of ingredients, such as so-called "sugar snakes" that form in the drain 220 of the beverage dispensing machine 250, with and/or without the use of water and/or carbonated water. The automated cleaning system 200 may also be retrofit into existing beverage dispensing machines, such as beverage dispensing machines that are capable of injecting a plurality of ingredients simultaneously with water or carbonated water through a nozzle. Further, it will be appreciated that the automated cleaning system 200 may eliminate the need to remove components of the beverage dispensing machine for cleaning. The automated cleaning system 200 may also ensure that regularly-scheduled maintenance, cleaning, and/or disinfecting operations are timely and accurately performed, which may eliminate the need for maintenance staff to perform such operations manually, thereby improving customer and/or consumer satisfaction with the beverage dispensing machine.

The cleaning supply 208 may be internal or external to the beverage dispensing machine 250. The cleaner in the cleaning supply 208 may flow through any micro, macro, or other lines to the nozzle 206. In an embodiment, the cleaning supply 208 may be external to the beverage dispensing machine 250 and a water line may run through the cleaning supply 208 and dissolve the cleaner as it passes through cleaning supply 208. In such an embodiment, the three-way valve 212 and/or the cleaning supply 208 may be located in a back room. Further, in such an embodiment, the cleaner may pass through a carbonation system and a cold plate in addition to the nozzle 206 and/or the drain 220.

In some embodiments, the supply line 211 may be directly connected in fluid communication with the drain 220 and/or routed directly to the drain 220 of the beverage dispensing machine 250 in addition to or in lieu of being dispensed through the nozzle 206. In such embodiments, during activation of the automated cleaning system 200 in the "cleaning mode," the cleaner from the cleaning supply 208 may be pumped by the pump 210 directly into, into contact with, and/or just above the drain 220 to clean the drain 220, remove build-up that has collected on the drain 220, eliminate microbiological growth that has formed on the drain 220, and/or eliminate a build-up of ingredients, such as so-called "sugar snakes" that form in the drain 220 of the beverage dispensing machine 250. Additionally, the cleaner from the cleaning supply 208 may be used with and/or without the use of water and/or carbonated water that may be dispensed through the nozzle 206 when required.

Figure 4:
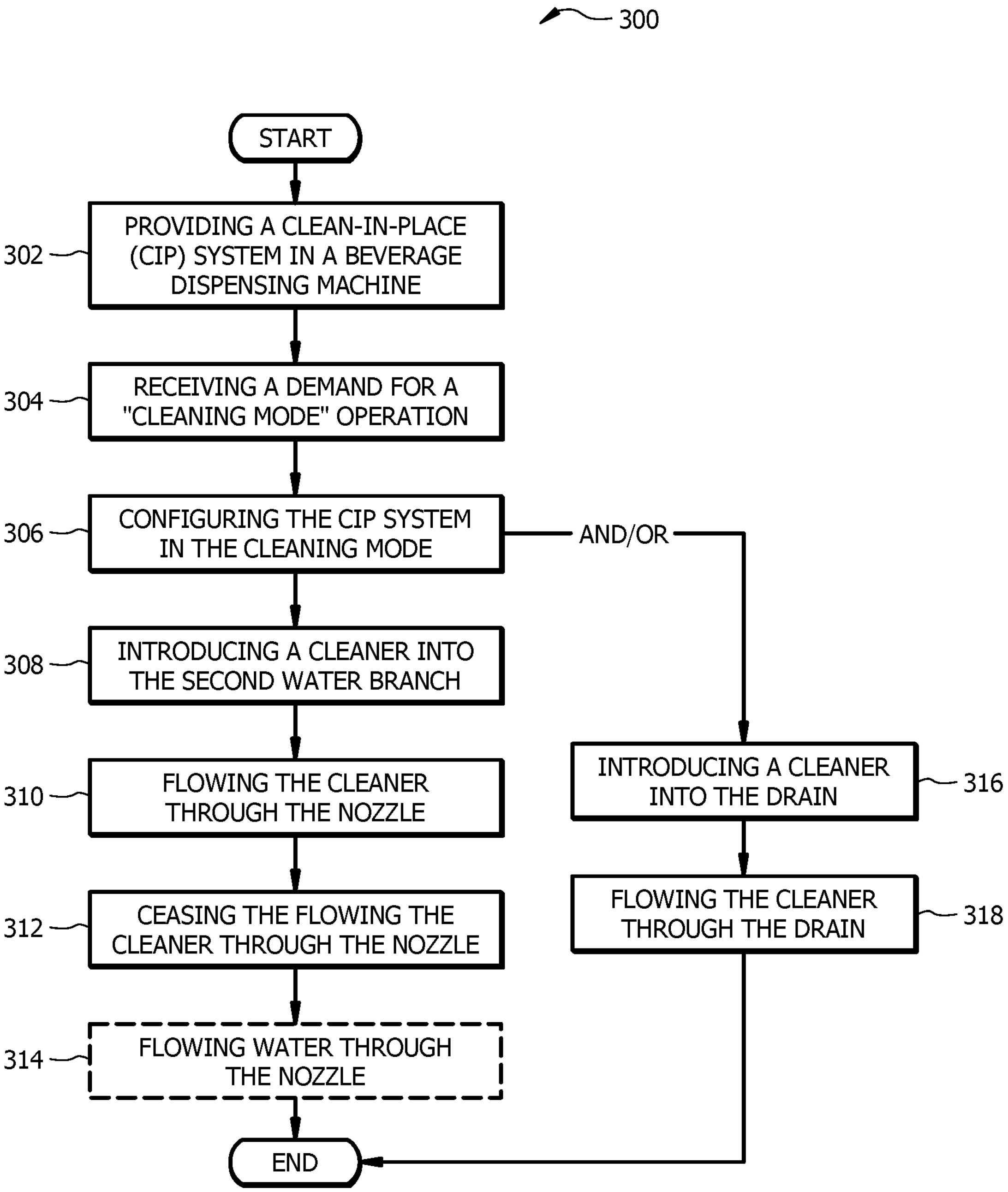
FIG. 4 is a flowchart of a method of operating an automated cleaning system according to an embodiment of the disclosure.

Referring now to FIG. 4, a flowchart of a method 300 of operating an automated cleaning system is shown according to an embodiment of the disclosure. The method 300 may begin at block 302 by providing a cleaning system 100, 200 in a beverage dispensing machine 150, 250. The method 300 may continue at block 304 by receiving a demand for a "cleaning mode" operation. In some embodiments, this may be performed based on a schedule stored in a system controller 101, 201 and/or manually via a user interface of the system controller 101, 201 of the automated cleaning system 100, 200. The method 300 may continue at block 306 by configuring the automated cleaning system 100, 200 in the "cleaning mode." In the case of automated cleaning system 200, the system controller 201 may configure a three-way valve 212 to provide a flow path between at least one of a water valve 202 and a carbonated water valve 204 through a dispensing branch 215 and through a secondary flow path 214" of the three-way valve 212 to the nozzle 206. In a first embodiment, the method 300 may continue at block 308 by introducing a cleaner into the dispensing branch 215. The method 300 may continue at block 310 by flowing the cleaner through the nozzle 206. The method 300 may continue at block 312 by ceasing the flowing the cleaner through the nozzle 206. In some embodiments, the method 300 may comprise a pre-flush operation and/or a post flush operation. For example, the method 300 may conclude at block 314 by flowing water through the nozzle 206.

In a second embodiment, which may occur in addition to or in lieu of the first embodiment, the method 300 may comprise introducing a cleaner into the drain 120, 220 at block 316. In the second embodiment, the method may conclude at block 318 by flowing the cleaner through the drain 120, 220. In some embodiments, the method 300 may also comprise returning the automated cleaning system 100, 200 to a "dispensing mode" operation.

Figure 8:
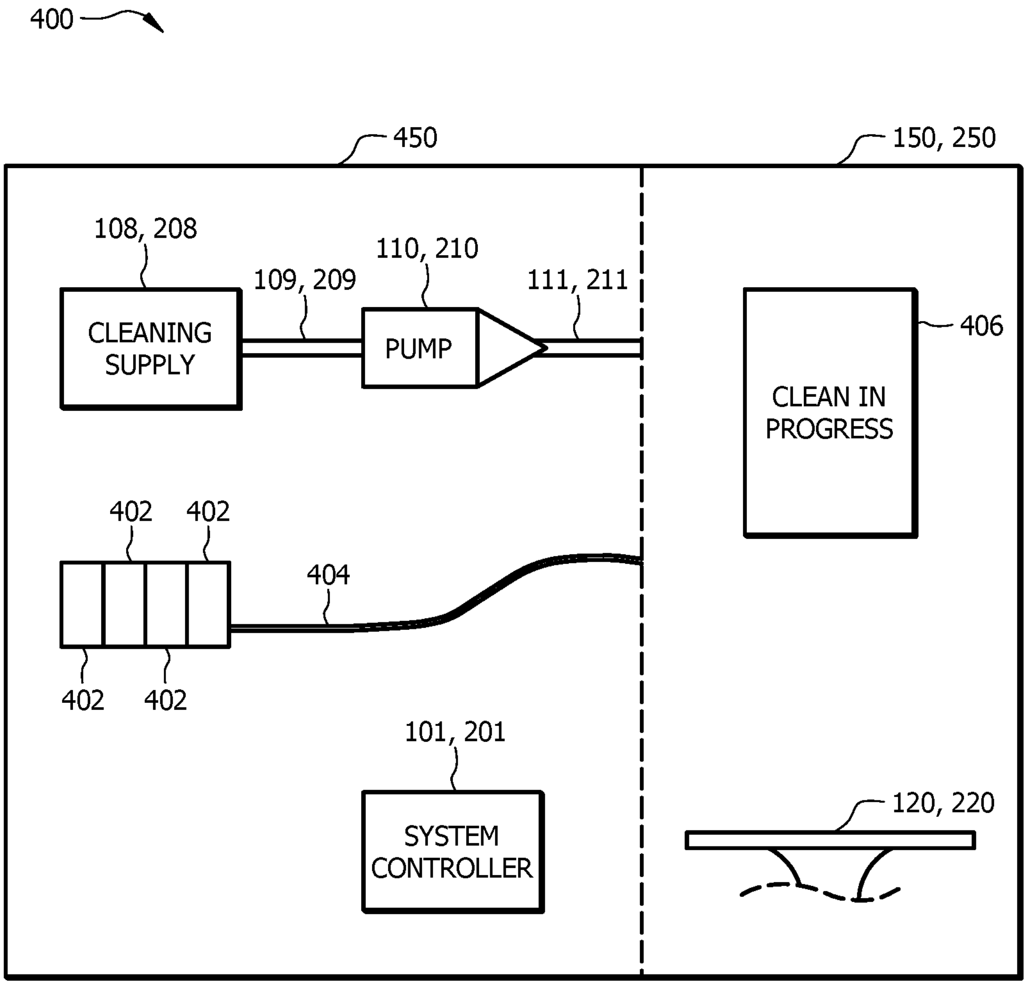
FIG. 8 is a schematic diagram of an automated cleaning system according to another alternative embodiment of the disclosure.

Referring now to FIG. 8, a schematic diagram of an automated cleaning system 400 is shown according to another alternative embodiment of the disclosure. Cleaning system 400 may generally be configured substantially similar to cleaning system 100 of any of FIGS. 1A-1D and/or cleaning system 200 of FIGS. 2-3 and operate in accordance with the methods disclosed herein, including but not limited to, the method 300 of FIG. 4. However, cleaning system 400 may be configured to store the cleaning system components such as a system controller 101, 201, a cleaning supply 108, 208, and/or a pump 110, 210 in a remote location 450 from the beverage dispensing machine 150, 250. In some embodiments, the remote location 450 may be a back storage room, a cabinet that supports the beverage dispensing machine 150, 250, a cabinet located closely to the beverage dispensing machine 150, 250, and/or any other remote location 450 where the cleaning supply 108, 208 may be connected to the beverage dispensing machine 150, 250.

Additionally, in some embodiments, other ingredients 402 may also be connected to the beverage dispensing machine 150, 250 through at least one other ingredient supply line 404. The other ingredients 402 may be stored in the remote location 450 as individual, replaceable cartridges containing the other ingredients 402. However, in other embodiments, each other ingredient 402 may be connected to the beverage dispensing machine 150, 250 through a dedicated other ingredient supply line 404, such that the beverage dispensing machine 150, 250 is connected to a plurality of other ingredients 402 through a plurality of other ingredient supply lines 404. Still further, at least in some embodiments, it will be appreciated that a beverage dispensing machine 150, 250 may comprise a display 406. In some embodiments, the display 406 may comprise a touch screen user interface that allows selection of a beverage to be dispensed through the beverage dispensing machine 150, 250. In some embodiments, the display 406 may allow selection of a cleaning process after entering a standby mode and/or a maintenance mode. However, in some embodiments, the display 406 may be configured to alert a user and/or consumer that a "cleaning operation" of the cleaning system 400 is in place.

Figure 9:
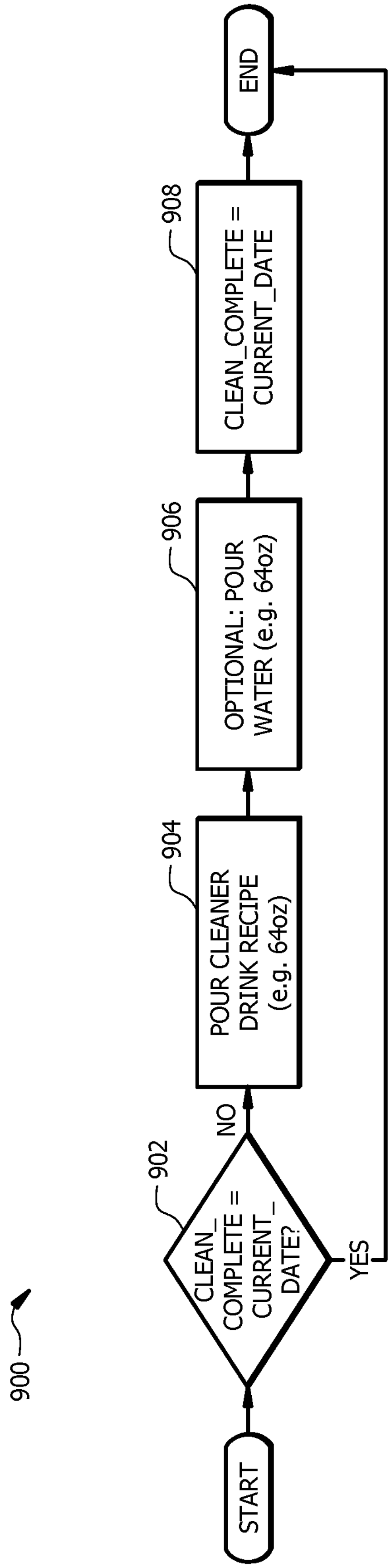
FIG. 9 is a flowchart of a process flow for an automated cleaning system according to an embodiment of the disclosure.

Referring now to FIG. 9, a flowchart of a process flow 900 for an automated cleaning system is shown according to an embodiment of the disclosure. The process flow 900 may begin at block 902 with a determination of whether automated cleaning of a beverage dispensing machine 150, 250 is needed. For example, a determination may be made whether a last time the automated cleaning process occurred matches a current date. If the determination is yes, the process flow 900 ends. If the determination is no, the process flow 900 may continue to block 904 where a cleaner drink recipe may be poured. The cleaner drink recipe may be with or without a diluent such as water or carbonated water. For example, if the cleaner is going straight to the drain 120, 220, the cleaner drink recipe may not include a diluent. In an embodiment, the cleaner drink recipe may be stored in a memory of the beverage dispensing machine 150, 250 and may instruct which ingredient pumps and/or valves to drive and when. The process flow 900 may optionally continue to block 906 where water is poured as a post-flush operation to help ensure that no cleaner remains in the dispensing components of the dispenser 150, 250. The process flow 900 may then conclude at block 908 where the date of the occurrence of the automated cleaning process now matches the current date.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An automated cleaning system for a beverage dispensing machine, comprising:

a pump configured to be coupled to a cleaning supply cartridge for dispensing a cleaner;

a supply line coupled directly to at least one drain line at a second end and coupled directly to the pump at a first end, such that a cleaner provided at the first end flows directly to the second end; and a controller configured to automatically operate the beverage dispensing machine in each of a cleaning mode and a dispensing mode, wherein, in the cleaning mode, the controller activates the pump to automatically deliver the cleaner from the cleaning supply cartridge via the supply line directly to and through the at least one drain line, and wherein, in the dispensing mode, the beverage dispensing machine dispenses a beverage through a nozzle;

wherein, in each of the dispensing mode and the cleaning mode, the supply line of the beverage dispensing machine is directly coupled to the at least one drain line bypassing the nozzle of the beverage dispensing machine, and the beverage dispensing machine allows a flow of a fluid through the nozzle.

2. The automated cleaning system of claim 1, further comprising:

multiple supply lines coupled directly to multiple drain lines.

3. The automated cleaning system of claim 2, wherein the supply line is one of the multiple supply lines.

4. The automated cleaning system of claim 2, wherein the multiple drain lines are for multiple beverage dispensing machines.

5. The automated cleaning system of claim 2, wherein the multiple drain lines are routed to a main floor drain.

6. The automated cleaning system of claim 2, wherein the controller activates the pump to deliver the cleaner from the cleaning supply cartridge via the multiple supply lines directly to the multiple drain lines.

7. The automated cleaning system of claim 1, wherein the cleaner comprises at least one of iodine or chlorine.

8. The automated cleaning system of claim 1, wherein the cleaner comprises an enzyme.

9. The automated cleaning system of claim 1, wherein the controller is configured to activate the pump at a predetermined time and/or based on a stored schedule.

10. A method of automatically cleaning a drain line of a beverage dispensing machine, the method comprising:

coupling a cleaning supply cartridge to a pump; and operating, via a controller, the beverage dispensing machine in each of a cleaning mode and a dispensing mode, wherein, in the cleaning mode, the controller activates the pump to automatically deliver a cleaner from the cleaning supply cartridge via a supply line coupled directly to the drain line of the beverage dispensing machine at a second end and coupled directly to the pump at a first end such that the cleaner flows directly from the first end to the second end, wherein, in the dispensing mode, the beverage dispensing machine dispenses a beverage through a nozzle, wherein, in each of the dispensing mode and the cleaning mode, the supply line of the beverage dispensing machine is directly coupled to the drain line bypassing the nozzle of the beverage dispensing machine, and the beverage dispensing machine allows a flow of fluid through the nozzle.

11. The method of claim 10, wherein the pump directly delivers the cleaner from the cleaning supply cartridge via multiple supply lines coupled directly to multiple drain lines.

12. The method of claim 11, wherein the multiple drain lines are for multiple beverage dispensing machines.

13. The method of claim 11, wherein the multiple drain lines are routed to a main floor drain.

14. The method of claim 11, wherein activating the pump further delivers the cleaner from the cleaning supply cartridge via the multiple supply lines to the multiple drain lines.

15. The method of claim 10, wherein the cleaner comprises at least one of iodine or chlorine.

16. The method of claim 10, wherein the cleaner comprises an enzyme.

17. The method of claim 10, wherein activating the pump occurs at a predetermined time and/or based on a stored schedule.

* * * * *